US007938331B2

(12) United States Patent
Brock et al.

(10) Patent No.: US 7,938,331 B2
(45) Date of Patent: May 10, 2011

(54) METHOD AND SYSTEM FOR ANTI-COUNTERFEIT BARCODE LABEL

(75) Inventors: Chris Brock, Manorville, NY (US); Robert Sanders, St. James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 947 days.

(21) Appl. No.: 11/771,446

(22) Filed: Jun. 29, 2007

(65) Prior Publication Data

US 2009/0001164 A1 Jan. 1, 2009

(51) Int. Cl.
*G06K 7/10* (2006.01)

(52) U.S. Cl. ................................... 235/462.01; 235/494

(58) Field of Classification Search .................. 235/454, 235/375, 462.01–462.45, 472.01, 472.02, 235/472.03, 494
See application file for complete search history.

(56) References Cited

U.S. PATENT DOCUMENTS 5,790,536 A * 8/1998 Mahany et al. ............... 370/338
6,612,494 B1 9/2003 Outwater
6,915,955 B2 * 7/2005 Jung et al. ................ 235/462.06
7,204,419 B2 * 4/2007 Lizotte et al. ............ 235/462.01
7,392,950 B2 * 7/2008 Walmsley et al. ....... 235/462.07
2002/0122878 A1 9/2002 Kerns
2007/0152032 A1 * 7/2007 Tuschel et al. ................ 235/375
2007/0152056 A1 * 7/2007 Tuschel et al. ................ 235/454

FOREIGN PATENT DOCUMENTS

WO 9724669 A 7/1997

OTHER PUBLICATIONS

International Search Report and the Written Opinion of the International Searching Authority for PCT/US2008/068740 mailed Nov. 12, 2009, a foreign counterpart.

* cited by examiner

*Primary Examiner* — Thien M Le

(57) ABSTRACT

Described are a system and a method for anti-counterfeit barcode labels. The system may include an automatic identification symbol reader obtaining item data and a first spectral signature data; a spectral signature reader obtaining a second spectral signature data from a spectral signature; and a processor for decoding and validating a automatic identification symbol as a function of a comparison of the first spectral signature data and the second spectral signature data.

20 Claims, 3 Drawing Sheets

METHOD AND SYSTEM FOR ANTI-COUNTERFEIT BARCODE LABEL

FIELD OF INVENTION

The present invention generally relates to a scanning system and method for detecting and/or reading spectrally-encoded serialized symbols in order to distinguish counterfeit symbols from genuine symbols, and to optimize the performance for optical reading devices, including, but not limited to, hand-held barcode scanners.

BACKGROUND

Barcodes are machine-readable (i.e., computer readable) representations of information on a surface. Optical scanning devices such as laser-based barcode scanners and image-based scanners are used in a multitude of situations for both personal and business purposes. Typical barcodes include vertical bar symbols formatted as two-dimensional matrices. A variety of barcode readers and laser scanning devices have been developed to decode these bar symbols into a multiple-digit representation of information such as inventory checks, delivery tracking, product sales, etc.

Many supply chains confront the problem of counterfeit goods within the chain. The product within these chains may be counterfeited and copied right down to the barcode label on the product, thereby making it very difficult to detect the counterfeit products from the genuine products. The current solutions involve product serialization and/or label serialization. However, these solutions require access to a database of serial numbers and any associated information in order to validate the authenticity of the product.

Standard barcode symbols are comprised of dark and light bars of varying widths. When light is projected onto these symbols, the light is mostly absorbed by the dark bars of the symbol and mostly backscattered by the light bars of the symbol. Accordingly, the pattern of symbols may be read by photo-detectors within the scanner or imager devices. An alternative to stimulation (or "excitement") wavelength. Upon irradiating the fluorescent ink of the symbol, the ink emits an activated light within a known band of wavelength readable to the photo-detector within the scanner or imager. Under normal lighting conditions, the fluorescent ink, itself, may be generally minimally visible, if not invisible, to the human eye. In addition, the activated light emitted from the fluorescent ink may also be minimally visible, if not invisible, to the human eye. Due to the fact that fluorescent barcodes are mostly invisible, the placement of a fluorescent barcode on a surface eliminates the need to obscure any underlying printed material on the surface. Furthermore, unlike the standard barcodes, the fluorescent barcode would not be difficult to read over a darkened background or surface.

SUMMARY OF THE INVENTION

The present invention relates to a system and a method for anti-counterfeit barcode labels. The system may include an automatic identification symbol reader obtaining item data and a first spectral signature data; a spectral signature reader obtaining a second spectral signature data from a spectral signature; and a processor for decoding and validating a automatic identification symbol as a function of a comparison of the first spectral signature data and the second spectral signature data.

The method according to the present invention may include the following steps. An automatic identification symbol is generated as a function of (i) item data and (ii) spectral signature data. The automatic identification symbol is applied onto an item. A spectral signature having a property corresponding to the spectral signature data is applied onto the item.

DETAILED DESCRIPTION

Figure 1:
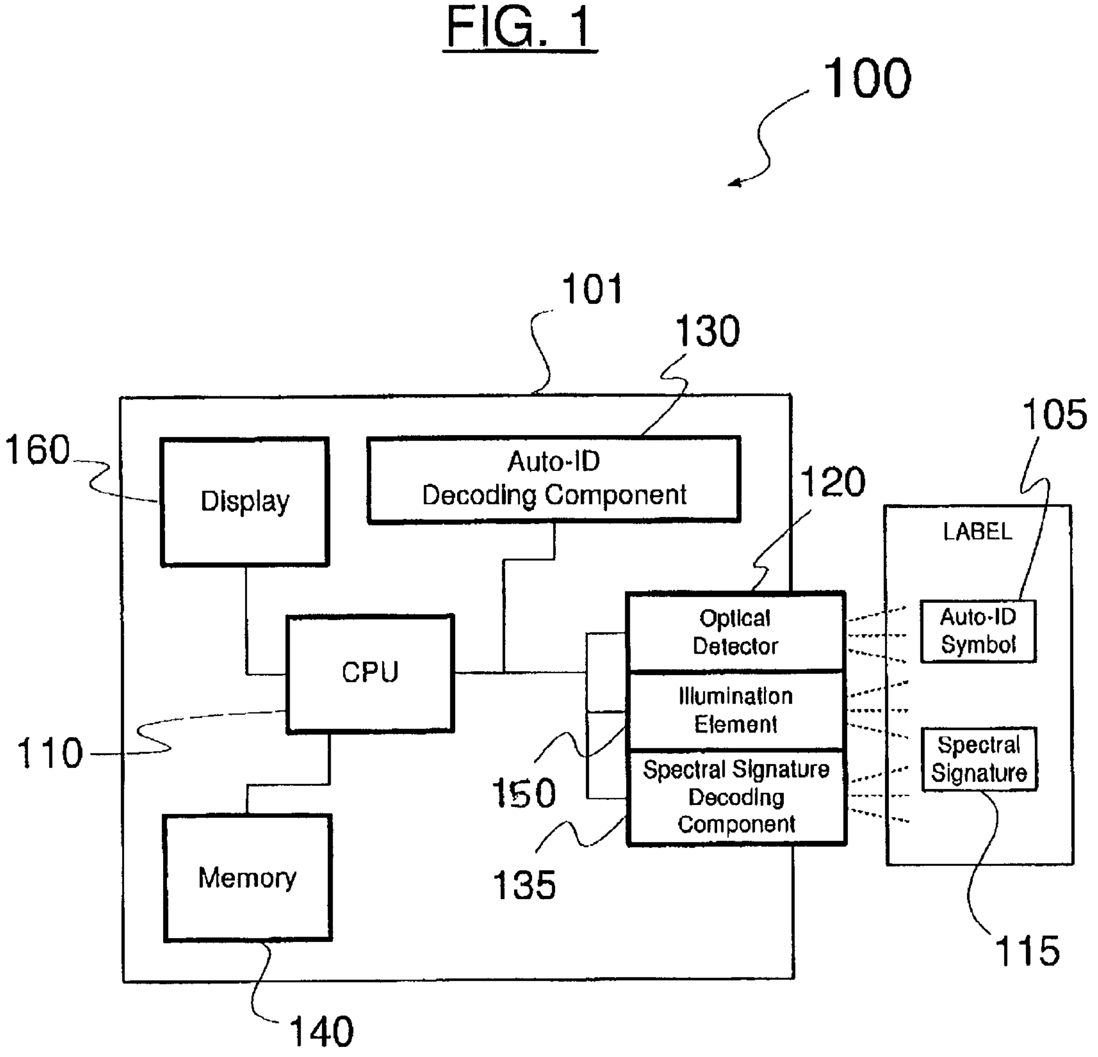
FIG. 1 shows an exemplary system for scanning and processing a spectral signature of a computer-readable automatic identification ("auto-id") symbol via a device, such as a hand-held barcode scanning mobile unit ("MU") according to exemplary embodiments of the present invention.

The present invention may be further understood with reference to the following description of exemplary embodiments and the related appended drawings, wherein like elements are provided with the same reference numerals. The present invention generally relates to a scanning system and method for detecting and/or reading spectrally-encoded, serialized symbols in order to distinguish counterfeit symbols from genuine symbols, and to optimize the performance for optical reading devices, such as hand-held barcode scanners. Specifically, the present invention is related to a system and method for serializing a label with a spectral signature. The exemplary system and method described herein may employ the use of an optical detector capable of reading and decoding an activated light (e.g., an output light) emitted from an exemplary symbol, such as a barcode symbol on a label. According to further embodiments of the present invention, an exemplary symbol may include a distinctive spectral signature that may be represented by encoded data according to a spectral encoding scheme.

The exemplary embodiments of the present invention provide an optical reading device with the functionality of determining a spectral signature on the exemplary symbol (e.g., a barcode on a label). Therefore, the optical reading device may detect and decode both the spectral signature as well as the symbol itself. Accordingly, at the point of detection, the optical reading device may also decrypt both the exemplary symbol and the spectral signature of the label and determine if the spectral signature corresponds to the symbol. Specifically, the label may include an encrypted representation of the spectral signature within the data of the symbol. Thus, if the spectral signature matches the encrypted representation from the symbol, the optical reading device may independently validate the label, without any need to reference a remote database.

Various embodiments of the present invention will be described with reference to a portable barcode scanner, such as, for example, a hand-held mobile imager. However, those skilled in the art will understand that the present invention may be implemented with any electrical and/or mechanical scanning device that is capable of reading and decoding symbols, such as barcode symbols.

FIG. 1 shows an exemplary system 100 for scanning and processing a spectral signature of a computer-readable automatic identification ("auto-id") symbol 105 via a device such as hand-held barcode scanning mobile unit ("MU") 101 according to exemplary embodiments of the present invention. The exemplary MU 101 may include a portable barcode scanner incorporating a laser diode, thereby allowing the user to scan the auto-id symbol 105 at various distances from the surface on which the barcode is affixed or imprinted. Alternatively, the exemplary MU 101 may also include an imager, such as charged couple device ("CCD"), for reading the auto-id symbol 105. This class of barcode scanners or imagers is generally known as CCD scanners. CCD scanners can record the auto-id symbol 105 by storing an image of the symbol 105 in a frame memory, which is then processed (e.g., scanned electronically) using software in order to convert the captured image into an output signal. Accordingly, the MU 101 illustrated in FIG. 1 may be any data acquisition device having imaging capabilities, CCD sensors, active pixel sensors using complementary metal-oxide-semiconductor ("CMOS") technology, etc.

According to an exemplary embodiment, FIG. 1 shows a block diagram view of the handheld MU 101 (e.g., the optical barcode scanner) according to the present invention. The MU 101 may include a "function module" or a central processing unit ("CPU") 110, an imaging component (e.g., an optical detector 120), an auto-id decoding component 130 (e.g., an optical barcode decoder), a spectral signature decoding component 135 (e.g., a spectrometer), a memory 140, a specialized illumination element 150 (e.g., a stimulating light source, such as a UV-emitting LED), and a display screen 160. While the MU 101 is illustrated in FIG. 1 as incorporating the illumination element 150 within the MU 101, an illumination element, according to an alternative embodiment, may be a separate component. For example, the illumination element 150 may be a "stand-alone" light source projecting stimulation light onto items on a conveyer belt or similar work area.

The CPU 110 may control one or more electrical and/or mechanical components for executing a function of the exemplary MU 101, such as barcode reading applications. Specifically, the CPU 110 may regulate the operation of the MU 101 by facilitating communications between the various components of the MU 101. For example, the CPU 110 may include a processor, such as a microprocessor, an embedded controller, an application-specific integrated circuit, a programmable logic array, etc. The CPU 110 may perform data processing, execute instructions, and direct a flow of data between devices coupled to the CPU 110 (e.g., the detector 120, the auto-id decoding component 130, the spectral signature decoding component 135, the memory 140, the display 160, etc.). As explained below, the CPU 110 may receive an input from the auto-id decoding component 130 and in response, may reference stored data within the memory 140 and display information to the user via the display 160.

Both the auto-id decoding component 130 and the spectral signature decoding component 135 may be communicatively coupled to the detector 120 of the MU 101 in order to process the data, such as images, provided to the CPU 110 by the detector 120. The display screen 160 may provide a user of the MU 101 with a graphical representation of the status and functions of the MU 101. Furthermore, according to an exemplary embodiment of the present invention, the display screen 160 may be an input device, such as a touch screen, allowing for user input. In addition, the detector 120 may include an optical lens. While the optical lens may be a single lens, the detector 120 may employ a group of lenses to function collectively as a single optical lens. Therefore, the references in this disclosure to the optical lens are not limited to a single lens, but instead may cover a plurality of lenses functioning as one lens. Furthermore, the single lens, or the plurality of lenses, may include various coatings applied to the surfaces of the lens(es). These coating may include an anti-reflective coating, a dielectric wavelength-dependent filter coating, as well as other coatings capable of performing additional light-altering effects.

The memory 140 may be any storage medium capable of being read from and/or written to by the CPU 110, or another processing device. The memory 140 may include any combination of volatile and/or nonvolatile memory (e.g., RAM, ROM, EPROM, Flash, etc.). The memory 140 may also include one or more storage disks such as a hard drive. According to one embodiment of the present invention, the memory 140 may be a temporary memory in which data may be temporarily stored until it is transferred to a permanent storage location (e.g., uploaded to a personal computer). In another embodiment, the memory 140 may be a permanent memory (e.g., an updateable database).

The computer-readable auto-id symbol 105 may be a barcode symbol printed onto a label or surface of a product, and the symbol 105 may include product data ("PD") and corresponding spectral signature data ("SSD"). The corresponding SSD may allow the auto-id symbol 105 to be associated, or identified, with a specific spectral signature 115 in order to validate the symbol 105. The auto-id symbol 105 may be readable by the optical detector 120. Specifically, from the auto-id symbol 105, the MU 101 may extract data related to the product in which the symbol 105 is printed on (e.g., PD), as well as data related to a spectral signature 115 printed on that product, or on a label on the product, (e.g., SSD). As will be described in greater detail below, the CPU 110 of the MU 101 may process both types of data (e.g., perform a comparison between the data) in other to validate the authenticity of the auto-id symbol 105, the label on the product, and/or the product itself. In other words, if the SSD extracted from the auto-id symbol 105 corresponds, or identifies, the spectral signature 115 located on the product, then the MU 101 may determine that auto-id symbol 105 is valid. However, if the SSD fails to identify the proper spectral signature 115, the auto-id symbol 105 may be invalidated. In addition, if the product or label does not include a spectral signature 115, the auto-id symbol 105 may be invalidated.

The spectral signature 115 may be configured to backscatter or reflect distinctive light (e.g., the activated light) in response to a stimulating light (e.g., an input light) emitted from the illumination element 150. The responding activated light may include light across the spectrum at various relative intensities defining a distinctive spectral curve or histogram when read by the spectral signature decoding component 135. This spectral curve may be described as the spectral signature 115. Thus, according to the exemplary embodiments of the present invention, the spectral signature 115 may be described as a unique symbol having a specific combination of reflected and/or absorbed electromagnetic radiation at varying wavelengths. Furthermore, each spectral signature 115 may include a distinctive SSD encoded into the symbol. An exemplary spectral signature 115 may be divided into multiple regions, wherein each of the regions may include reactive elements capable of emitting (e.g., backscattering or reflecting back) an activated light in response to the stimulating light received from the illumination element 150 of the MU 101. The spectral signature 115 may be a material property of the label on a product, or of the product, itself. According to one embodiment of the present invention, the spectral signature 115 may contain a colored dye, such as fluorescent ink, that may be activated (e.g., excited) through the use of a stimulating light source, such as a UV-light source, provided by the illumination element 150 of the MU 101. Specifically, upon illuminating the fluorescent ink within the stimulating light source (e.g., UV-light source of illumination element 150), the fluorescent ink may be activated, thereby emitting an activated fluorescent light within a certain band of wavelengths. The spectral signature decoding component 135 of the MU 101 may be capable of detecting this activated fluorescent light in order to read and process the pattern of the spectral signature 115 printed in the fluorescent link. Upon detecting the spectral signature 115, the spectral signature decoding component 135 may then decode the spectral signature 115 in order to extract the corresponding SSD. The spectral signature decoding component 135 need not be of the analytical resolution used in many laboratories, as a relatively simple and inexpensive spectral signature decoding component 135 may be utilized.

As described above, an exemplary spectral signature 115 may be encoded with corresponding an identifying SSD. The SSD may be a number within a series of SSDs. For example, a manufacturer may use a predetermined number of spectral signatures 115 on a given product line, such as a thousand unique spectral signatures 115, wherein each spectral signature 115 may be assigned a number SSD for identification. Therefore, the spectral signature 115 may be placed on a product and may be read (e.g., decoded) by an appropriate detector, such the detector 120. As will be described in further detail below, the validity of a label and/or an auto-id symbol 105 may be confirmed by comparing the SSD of the spectral signature 115 to the SSD of the auto-id symbol 105 printed on the label or product. Furthermore, the exemplary fluorescent ink may be activated through an ultra-violet light source (e.g., the illumination element 150). However, it is important to note that additional embodiments within the scope of the present invention may use a variety of alternative inks and light sources, such as, for example, incandescent inks, phosphorescent inks, far-end and near-infrared activated inks and any corresponding stimulating light sources.

As described above, the illumination element 150 may allow the MU 101 to produce a stimulating light in order to activate the spectral signature 115 on a label or product thereby creating a detectable backscattered light, or reflected light, distinctive to the spectral signature 115. According to one embodiment of the present invention, the illumination element 150 may be a UV-emitting diode ("LED") capable of stimulating fluorescent ink of the auto-id symbol 105. The spectral signature decoding component 135 of the MU 101 may selectively activate the illumination element 150 when the spectral signature decoding component 135 is attempting to capture data corresponding to the spectral signature 115. The use of the illumination element 150 will be described in further detail below.

According to exemplary embodiments of the present invention, the spectral signature 115 may be of low data resolution in order to reduce the cost associated with the spectral signature decoding component 135. As described above, a relatively small number of valid spectral signatures may be combined with a traditional barcode through the SSD. For example, there may be only a few hundred or a few thousand variations of the spectral signatures 115, each having a corresponding SSD. Accordingly, a manufacturer of a product may assign a random spectral signature 115 to a serialized label on the product. Each of these products could include a representation of a certain spectral signature 115 (e.g., the SSD) within the auto-id symbol 105 of the product. Thus, in addition to the encoded PD, the auto-id symbol 105 may also include an encoded SSD for verification purposes. According to the preferred embodiments of the present invention, the SSD encoded within the auto-id symbol 115 may be encrypted to prevent a counterfeiter from producing a valid label. A suitable encryption scheme may be implemented to preclude a counterfeiter from being able to produce replica labels, or barcodes. For example, the encryption schemes may include one or more schemes, such as long keys, digital signatures, public key techniques, and any other data obfuscation scheme to protect the integrity of the system.

As discussed above, the spectral signature decoder 135 (e.g., a spectrometer, an optical spectrum analyzer, etc.) may read the distinctive backscattered light from spectral signature 115 of a label when it scanned by the MU 101. Specifically, the spectral signature decoder 135 may perform image processing techniques on the light. These techniques may include separating portions of the backscattered light, such as the red, green, blue and near-infrared portions of the electromagnetic spectrum, as acquired by decoder 135. Therefore, the spectral signature decoder 135 may use the image processing techniques to decode the spectral signature 115.

According to an exemplary embodiment of the present invention, the detector 120 of the MU 101 may be in communication with the auto-id decoding component 130, such as the optical barcode reader, and may transmit captured image data to the decoding component 130. The decoding component 130 may then process the captured image data from the auto-id symbol 105. The processed image data may be transmitted to the CPU 110 for further processing. Specifically, the CPU 110 may correlate the image data with any data stored within the memory 140 and/or separate storage component separate from the MU 101. While the decoding component 130, as illustrated in FIG. 1, appears as a separate component from the CPU 110, alternative embodiments of the present invention may incorporate the functions and processes of the decoding component 130 into the CPU 110, effectively combining the separate components into a single component.

Figure 2:
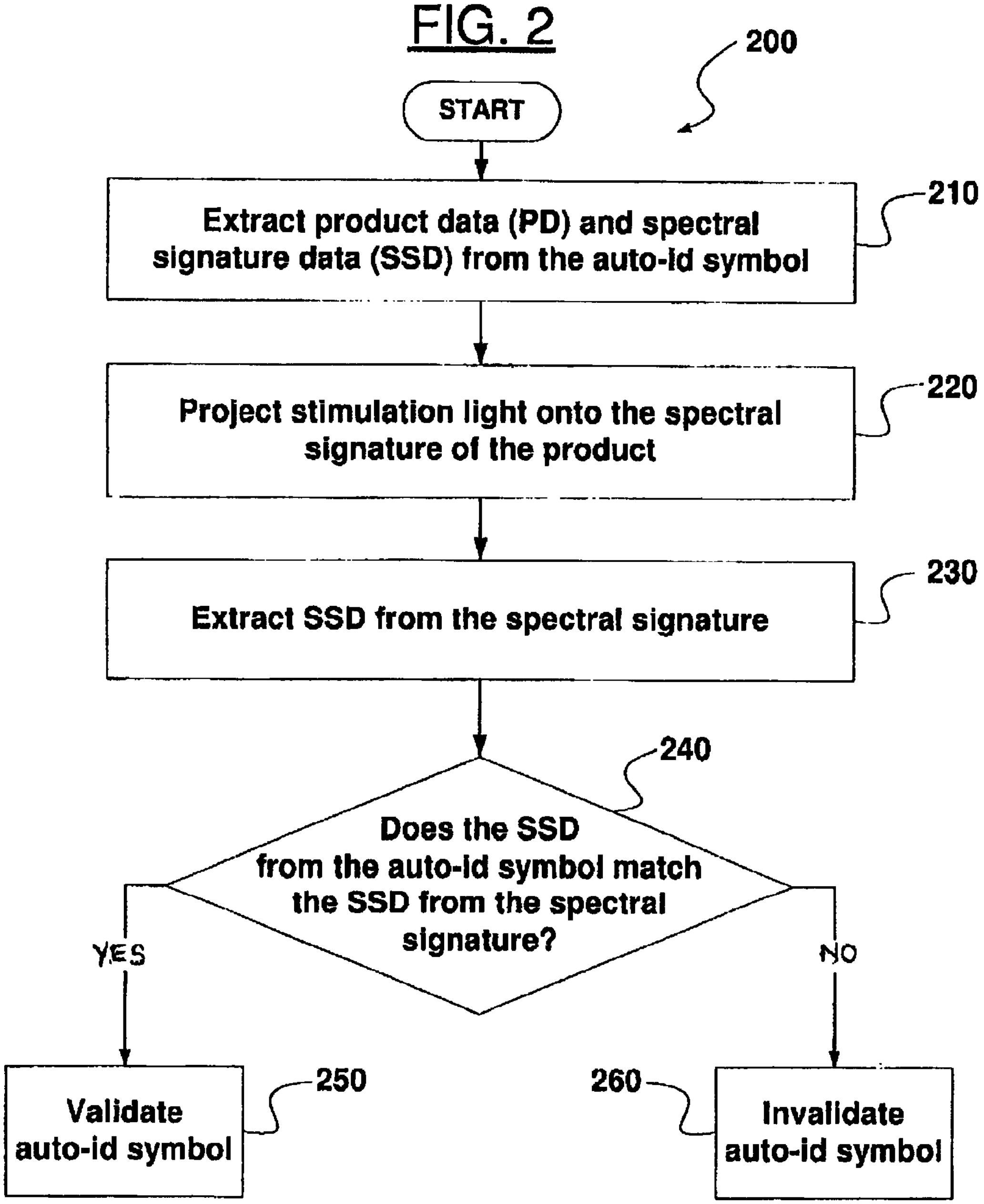
FIG. 2 represents an exemplary method for validating a label including a spectral signature and an auto-id symbol according to the embodiment of the present invention.

FIG. 2 represents an exemplary method 200 for validating a label including a spectral signature 115 and an auto-id symbol 105 according to the embodiment of the present invention. The exemplary method 200 will be described with reference to the exemplary system 100 of FIG. 1. As described above, the exemplary MU 101 may be a data acquisition device such as an optical barcode scanner for reading the auto-id symbol 105. Both the auto-id symbol 105 and the exemplary spectral signature 115 may include encoded predetermined label information, such as the identifying SSD. The spectral signature 115 may emit an activated light having a distinctive wavelength in response to a stimulating light. For example, the spectral signature may be printed in fluorescent ink that is reactive to a stimulating light from the illumination element 150. As described above, the MU 101 may further include an illumination element 150 for stimulating the fluorescent ink of the spectral signature 115. According to an exemplary embodiment of the present invention, the spectral signature decoding component 135 of the MU 101 may further include an optical lens 125 with a fluorescent filter for minimizing the amount of ambient light received by the detector 120.

In step 210, the optical detector 120 of the MU 101 may read an auto-id symbol 105 (e.g., a barcode) printed on a label or a product in order to extract product data ("PD") and an SSD (e.g., data identifying an associated spectral signature for the label/product). Specifically, the auto-id decoding component 130 (e.g., an optical barcode decoder) of the MU 101 may decode the information received from the optical detector 120 to extract both forms of data (i.e., PD and SSD). As described above, the SSD within the auto-id symbol 105 may be encrypted as to prevent a counterfeit manufacturer from creating false auto-id symbols on a counterfeit products.

Accordingly, the SSD from an auto-id symbol 105 on any product may be compared with the SSD of the spectral signature 115 on the same product to verify the authenticity of that product. In addition, the PD and the SSD extracted from the auto-id symbol 105 may be transmitted to the CPO 110 for processing. Furthermore, the extracted data may me stored in the memory 140 of the MU 101.

In step 220, the MU 101 may initiate a data acquisition process by projecting a stimulation light from the illumination element 150 towards the spectral signature 115. In other words, the spectral signature 115 may contain a substance, such as a phosphor, that emits the activated fluorescent light in response to the UV radiation of the illumination element 150. Specifically, when the substance (e.g., the phosphor) is exposed to UV radiation, it may convert this electromagnetic energy received from the illunination element 150 into visible light, readable by the spectral signature decoding component 135. According to the exemplary embodiment of the present invention, the illumination element 150 may be a UV-emitting LED, emitting electromagnetic energy, or radiation, within a wavelength range of 320-400 nanometers (i.e., long-wave UV radiation, or UV-A light). Thus, the fluorescent ink of the spectral signature 115 may initially be invisible to the human eye or to the spectral signature decoding component 135. However, upon absorbing the UV radiation emitted from the illumination element 150, the spectral signature 115 may then become visible (i.e., readable) to the spectral signature decoding component 135. The spectral signature 115 may be decoded to extract the SSD of that specific spectral signature 115.

In step 230, the spectral signature decoding component 135 of the MU 101 may read spectral signature 115 printed on a label or a product in order to extract the SSD identifying the spectral signature 115. Specifically, spectral signature 115 may be readable once the illumination element 150 has projected the stimulating light onto the spectral signature 115, from step 220. As described above, the exemplary spectral signature 115 may be divided into multiple regions, wherein each of the regions may include reactive elements capable of backscattering an activated light in response to the stimulating light. Accordingly, each of the regions may emit an activated light of a distinctive wavelength. Thus, the configuration of the locations and the wavelengths for each of the regions may create the spectral signature 115. Thus, the spectral signature decoding component 135 of the MU 101 may read and decode the backscattered light emitted from the regions within the spectral signature 115. Similar to the data extracted from the auto-id symbol 105, the SSD extracted from the spectral signature 115 may be transmitted to the CPU 110 for processing. Furthermore, the extracted data may be stored in the memory 140 of the MU 101.

In step 240, the SSD extracted from the auto-id symbol 105 may be compared to the SSD extracted from the spectral signature 115. Specifically, the method 200 may determine if the SSD extracted from the auto-id symbol 105 matches the SSD extracted from the spectral signature 115. As described above, a manufacturer may assign a plurality of spectral signatures 115 to each of the auto-id symbols 105 printed or placed onto its products, wherein each spectral signature 115 is associated with an SSD. According to one embodiment of the present invention, the SSD within the auto-id symbol 105 may be encrypted representations of the spectral signature 115. Thus, upon reading the auto-id symbol 105, the encrypted SSD may be decrypted and compared with the SSD of the spectral signature 115 on the product. Specifically, the CPU 110 of the MU 101 may perform the comparison between the SSDs.

If the CPU 110 determines that the SSD from the auto-id symbol 105 matches the SSD associated with the spectral signature 115 on the label or product, the method 200 may advance to step 250. Accordingly, in step 250, the CPU 110 may validate the auto-id symbol 105. Alternatively, if the CPU 110 determines that the SSD does not identify the spectral signature 115 located on the product (e.g., the SSD does not match the SSD of the spectral signature 115), the method 200 may advance to step 260. It should also be noted that if the product does not include a spectral signature 115, the method 200 may advance to step 260. Accordingly, in step 260, the CPU 110 may invalidate the auto-id symbol 105. Thus, the product and/or the auto-id symbol 105 may be deemed counterfeit. Thus, the exemplary embodiment of the MU 101 may determine the spectral signature 115 and read the associated auto-id symbol 105 to validate the auto-id symbol 105 at the point of detection (e.g., at the MU 101). However, an alternative embodiment system may be effectively built with a discrete barcode reader and a spectrometer, wherein the information from both is obtained sequentially and compared in either the barcode reader, the spectrometer, or in a controlling device such as a PC.

Figure 3:
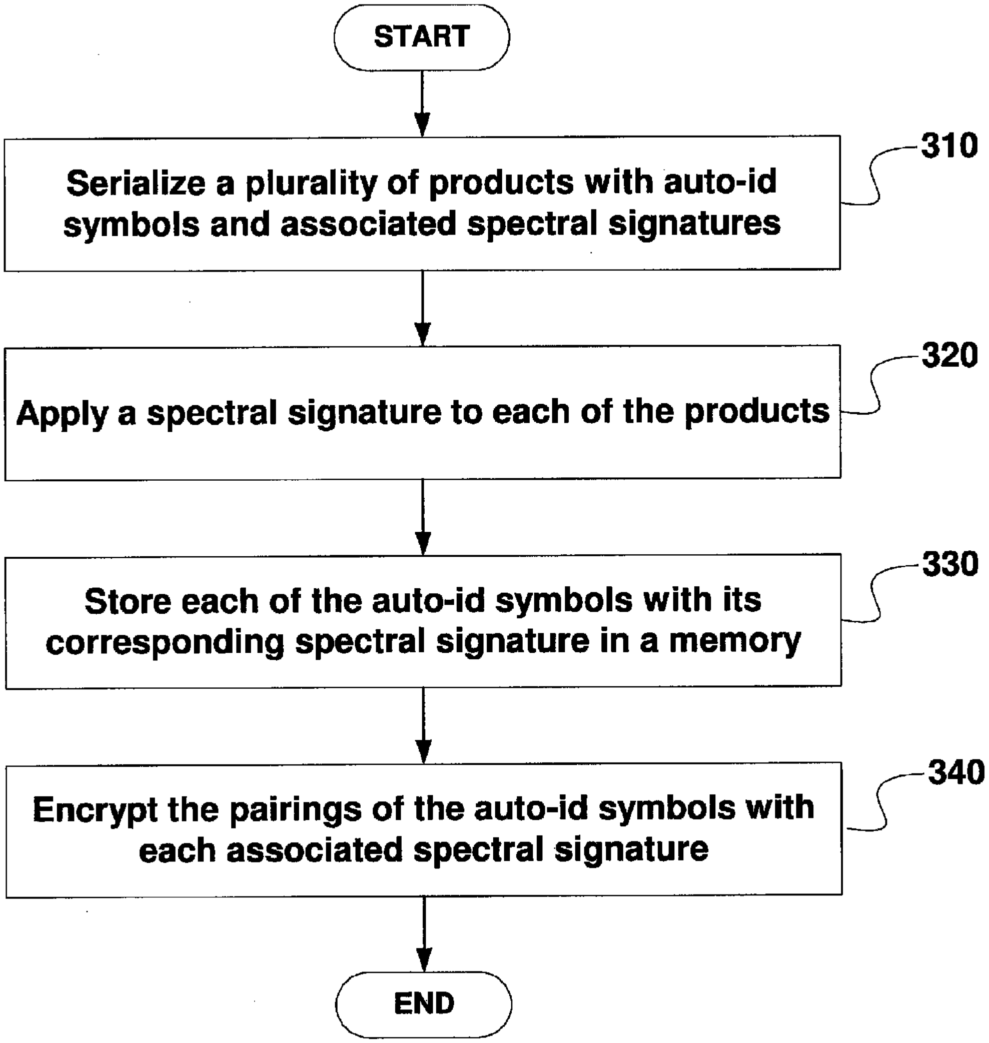
FIG. 3 represents an exemplary method for serializing the auto-id symbol in order to associate the symbol with a particular spectral signature according to the embodiment of the present invention.

FIG. 3 represents an exemplary method 300 for serializing the auto-id symbol 105 of a product in order to associate the symbol 105 with a particular spectral signature 115 according to the embodiment of the present invention.

In step 310, the method 300 may serialize a plurality of products in a product line (e.g., items from a manufacturer) with multiple auto-id symbols 105 and associate each auto-id symbol 105 with a particular spectral signature 115. As described above, there may be a predetermined number of valid spectral signatures 115 (e.g., a series of 1000 unique spectral signatures 115) readable to the MU 101. Each auto-id symbol 105 may contain an SSD, identifying an associated spectral signature 115. Specifically, the method 300 may generate the auto-id symbol 105 as a function of PD and SSD. The SSD of the auto-id symbol 105 may be an encrypted representation of the associated spectral signature 115. The auto-id symbol 105 may be applied to a label or a surface of the product. Thus, each product may be assigned a corresponding spectral signature 115. According to the exemplary embodiment of the present invention, the method 300 may be performed by the MU 101.

In step 320, the method 300 may apply the corresponding spectral signature 115 to each of the products based on the associated auto-id symbol 105. Specifically, each of the spectral signatures applied to a product may correspond to one or more auto-id symbols 105 of step 310. In other words, an auto-id symbol 105 may have one SSD encoded within the symbol, wherein the SSD is a representation of one spectral signature 115. However, one spectral signature 115 may be associated with multiple auto-id symbols 105. Thus, a relatively small number of spectral signatures 115 may be needed for a larger number of auto-id symbols 105. For example, a first auto-id symbol may include $PD_1$ and $SSD_1$, and the associated spectral signature may include $SSD_1$. Therefore, the first auto-id symbol on a label may be validated if the spectral signature represented by $SSD_1$ is also on the label. Furthermore, a second auto-id symbol may include $PD_2$ and $SSD_1$ as well, and the associated spectral signature may include $SSD_1$. Likewise, the second auto-id symbol on a further label may be validated if the spectral signature represented by $SSD_1$ is also on the further label.

The spectral signature 115 may be composed of a fluorescent material invisible (or nearly invisible) to the human eye, thereby making the spectral signature 115 difficult to counterfeit. As described above, the material of the spectral signature 115 may react to a stimulating light emitted from the illumination element 150 of the MU 101. Accordingly, the spectral signature 115 emit an activated light readable to the MU 101, wherein the MU 101 is able to identify spectral signature 115 and verify that the auto-id symbol 105 includes the corresponding SSD.

In step 330, the method 300 may store each auto-id symbol 105 with its corresponding SSD in the memory 140 of the MU 101. For example, the memory 140 may include a database listing each pairing of the auto-id symbols 105 with its associated spectral signature 115. This database may be referenced by the MU 101 while verifying the validity of the auto-id symbols 105 of multiple products in a product line.

In step 340, the method 300 may encrypt the pairing of the auto-id symbol 105 and the spectral signature 115. Accordingly, the method 300 may utilize an encryption scheme suitable for precluding any counterfeit production of false labels and/or auto-id symbols 105 on a product. Thus, the encryption scheme (e.g., public key techniques, digital signatures, long keys, etc.) may conceal the association between each of the auto-id symbols 105 its corresponding spectral signature 115, thereby protecting the integrity of the system.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
generating an automatic identification symbol as a function of (i) item data and (ii) spectral signature data;
applying the automatic identification symbol onto an item; and
applying a spectral signature having a property corresponding to the spectral signature data onto the item.

2. The method according to claim 1, further comprising:
encrypting a representation of the spectral signature data within the automatic identification symbol.

3. The method according to claim 1, wherein the automatic identification symbol is a barcode.

4. The method according to claim 1, wherein the spectral signature include fluorescent material, the spectral signature emitting a fluorescent light upon being activated, the fluorescent light having a wavelength within a predetermined range.

5. The method according to claim 1, further comprising:
storing the automatic identification symbol and the property corresponding to the spectral signature data in a memory.

6. The method according to claim 1, further comprising:
serializing a product line including the item with a predetermined number of spectral signatures, wherein the property corresponding to the spectral signature data is a serialized label.

7. The method according to claim 1, wherein the automatic identification symbol and the spectral signature is readable by a mobile computing device.

8. A method, comprising:
obtaining (i) item data and (ii) a first spectral signature data from an automatic identification symbol on an item;
generating a second spectral signature data as a function of a property of a spectral signature on the item; and
validating the automatic identification symbol as a function of a comparison of the first spectral signature data and the second spectral signature data.

9. The method according to claim 8, wherein the automatic identification symbol is validated if the first spectral signature data is determined to match the second spectral signature data.

10. The method according to claim 8, further comprising:
encrypting a representation of the first spectral signature data within the automatic identification symbol.

11. The method according to claim 8, wherein the automatic identification symbol is a barcode.

12. The method according to claim 8, wherein the spectral signature include fluorescent material, the spectral signature emitting a fluorescent light upon being activated, the fluorescent light having a wavelength within a predetermined range.

13. The method according to claim 8, further comprising:
storing the automatic identification symbol and the second spectral signature data in a memory.

14. The method according to claim 8, further comprising:
serializing a product line with a predetermined number of spectral signatures, wherein the a first spectral signature data is a serialized label.

15. The method according to claim 8, wherein the automatic identification symbol and the spectral signature is readable by a mobile computing device.

16. A system, comprising:
an automatic identification symbol reader obtaining item data and a first spectral signature data from an automatic identification symbol on an item;
a spectral signature reader obtaining a second spectral signature data from a spectral signature on the item; and
a processor for decoding and validating the automatic identification symbol as a function of a comparison of the first spectral signature data and the second spectral signature data.

17. The system according to claim 16, wherein the spectral signature is printed using a fluorescent ink, the spectral signature emitting a fluorescent light upon being activated, the fluorescent light having a wavelength within a predetermined range.

18. The system according to claim 16, further comprising:
an illumination element transmitting light to the target, the target including light-activated ink activated by the illumination element.

19. The system according to claim 18, wherein the illumination element is an ultra-violet ("UV") light emitting diode ("LED").

20. The system according to claim 16, wherein the system is operable on an image-based barcode scanner.

* * * * *

UNITED STATES PATENT AND TRADEMARK OFFICE

CERTIFICATE OF CORRECTION

PATENT NO. : 7,938,331 B2
APPLICATION NO. : 11/771446
DATED : May 10, 2011
INVENTOR(S) : Brock et al.

It is certified that error appears in the above-identified patent and that said Letters Patent is hereby corrected as shown below:

In Column 1, Line 40, after "alternative to" insert -- the standard barcode symbols is fluorescent barcode symbols printed using fluorescent ink. The fluorescent ink of the symbol may be irradiated by stimulating light having a corresponding --.

In Column 7, Line 16, delete "illunination" and insert -- illumination --, therefor.

Signed and Sealed this
Fifteenth Day of January, 2013

David J. Kappos
*Director of the United States Patent and Trademark Office*